US008207974B2

(12) United States Patent
Sakariya

(10) Patent No.: US 8,207,974 B2

(45) Date of Patent: Jun. 26, 2012

(54) SWITCH FOR GRAPHICS PROCESSING UNITS

(75) Inventor: Kapil V. Sakariya, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 543 days.

(21) Appl. No.: 12/347,364

(22) Filed: Dec. 31, 2008

(65) Prior Publication Data

US 2010/0164963 A1 Jul. 1, 2010

(51) Int. Cl.
*G06F 15/16* (2006.01)
*G06F 15/00* (2006.01)

(52) U.S. Cl. ......................... 345/503; 345/502; 345/501

(58) Field of Classification Search .......... 345/501–503, 345/505

See application file for complete search history.

(56) References Cited

U.S. PATENT DOCUMENTS

| | | | | |
|---|---|---|---|---|
| 5,963,200 | A * | 10/1999 | Deering et al. | 345/213 |
| 6,535,208 | B1 | 3/2003 | Saltchev et al. | |
| 6,557,065 | B1 * | 4/2003 | Peleg et al. | 710/300 |
| 6,624,816 | B1 | 9/2003 | Jones, Jr. | |
| 7,119,808 | B2 * | 10/2006 | Gonzalez et al. | 345/502 |
| 7,309,287 | B2 * | 12/2007 | Miyamoto et al. | 463/37 |
| 7,382,333 | B2 | 6/2008 | Chen et al. | |
| 2005/0099431 | A1 | 5/2005 | Herbert et al. | |
| 2008/0030509 | A1 | 2/2008 | Conroy et al. | |
| 2009/0153528 | A1 * | 6/2009 | Orr | 345/204 |
| 2010/0091039 | A1 | 4/2010 | Marcu et al. | |
| 2010/0103147 | A1 | 4/2010 | Sumpter | |
| 2010/0164964 | A1 | 7/2010 | Sakariya et al. | |
| 2010/0164966 | A1 | 7/2010 | Sakariya | |
| 2011/0032275 | A1 | 2/2011 | Marcu et al. | |

FOREIGN PATENT DOCUMENTS

| | | |
|---|---|---|
| EP | 0272655 | 6/1988 |
| EP | 1158484 | 11/2001 |
| EP | 1962265 | 8/2008 |
| JP | 06006733 | 1/1994 |
| WO | WO2005059880 | 6/2005 |

* cited by examiner

*Primary Examiner* — Joni Hsu

(74) *Attorney, Agent, or Firm* — Dorsey & Whitney LLP

(57) ABSTRACT

Methods and apparatuses are disclosed for improving switching between graphics processing units (GPUs). Some embodiments may include a display system, including a plurality of GPUs, a multiplexer coupled to the plurality of GPUs, a timing controller coupled to the multiplexer, where the timing controller may provide an indication signal to the multiplexer indicative of a period when a first GPU is experiencing a first blanking interval.

14 Claims, 3 Drawing Sheets

SWITCH FOR GRAPHICS PROCESSING UNITS

RELATED APPLICATIONS

This application is related to, and incorporates by reference, the following applications: "Timing Controller Capable of Switching Between Graphics Processing Units," filed on the same date as this application and identified as Ser. No. 12/347,312; "Display System With Improved Graphics Abilities While Switching Graphics Processing Units," filed on the same date as this application and identified as Ser. No. 12/347,413; and "Improved Timing Controller for Graphics System" filed on the same date as this application and identified as Ser. No. 12/347,491.

BACKGROUND OF THE INVENTION

1. Technical Field

The present invention relates generally to graphics processing units (GPUs) of electronic devices, and more particularly to switching between multiple GPUs during operation of the electronic devices.

2. Background

Electronic devices are ubiquitous in society and can be found in everything from wristwatches to computers. The complexity and sophistication of these electronic devices usually increase with each generation, and as a result, newer electronic devices often include greater graphics capabilities their predecessors. For example, electronic devices may include multiple GPUs instead of a single GPU, where each of the multiple GPUs may have different graphics capabilities. In this manner, graphics operations may be shared between these multiple GPUs.

Often in a multiple GPU environment, it may become necessary to swap control of a display device among the multiple GPUs for various reasons. For example, the GPUs that have greater graphics capabilities may consume greater power than the GPUs that have lesser graphics capabilities. Additionally, since newer generations of electronic devices are more portable, they often have limited battery lives. Thus, in order to prolong battery life, it is often desirable to swap between the high-power GPUs and the lower-power GPUs during operation in an attempt to strike a balance between complex graphics abilities and saving power.

Regardless of the motivation for swapping GPUs, swapping GPUs during operation may cause defects in the image quality, such as image glitches. Although techniques have been developed for switching between GPUs during the vertical or horizontal blanking periods, such approaches often involve circuitry with complex performance requirements, additional power usage, and/or increased cost. This may be especially true when switching between an internal GPU and an external GPU. Accordingly, methods and apparatuses that more efficiently switch between GPUs are needed.

SUMMARY

Methods and apparatuses are disclosed for improving switching between graphics processing units (GPUs). Some embodiments may include a display system, including a plurality of GPUs, a multiplexer coupled to the plurality of GPUs, a timing controller coupled to the multiplexer, where the timing controller may provide an indication signal to the multiplexer indicative of a period when a first GPU is experiencing a first blanking interval.

Other embodiments may include a method of switching between GPUs during operation of a display system, the method may include determining if a switching window exists, in the event that a switching window exists, determining if a host computer requested a GPU switch, in the event that a host computer requests a GPU switch, switching from a first GPU to a second GPU, determining if the second GPU enters a blanking interval that is subsequent to the switching window, and in the event that the second GPU enters a blanking window that is subsequent to the switching window, displaying at least one image on a display from the second GPU.

Still other embodiments may include a method of switching between GPUs during operation of a display system, the method may include determining if the first GPU has undergone a horizontal blanking interval (HBI) a predetermined number of times, in the event that the first GPU has undergone an HBI a predetermined number of times, determining if a second GPU is undergoing a VBI, and in the event that the second GPU is undergoing a VBI, calibrating the second GPU such that an image of the second GPU is substantially synchronous with another image of the first GPU.

BRIEF DESCRIPTION OF THE DRAWINGS

The use of the same reference numerals in different drawings indicates similar or identical items.

DETAILED DESCRIPTION OF THE INVENTION

The following discussion describes various embodiments that allow greater flexibility in switching between GPUs during operation of a display system without introducing visual artifacts into the image being displayed. Some embodiments may implement an analog multiplexer that switches between GPUs during a switching window. The switching window may include an overlapping time frame of the vertical and/or horizontal blanking intervals of the GPUs being switched. One or more blocks within the display system, such as a timing controller, may indicate to the analog multiplexer when this switching window occurs. Unlike conventional multiplexer approaches, the analog multiplexer need not decode and/or encode the images to be displayed to determine an appropriate switching window. As a result, the graphics multiplexer may have less stringent performance requirements, consume less power, and/or cost less to manufacture than conventional approaches.

Although one or more of these embodiments may be described in detail, the embodiments disclosed should not be interpreted or otherwise used as limiting the scope of the disclosure, including the claims. In addition, one skilled in the art will understand that the following description has broad application. Accordingly, the discussion of any embodiment is meant only to be exemplary and is not intended to intimate that the scope of the disclosure, including the claims, is limited to these embodiments.

Figure 1:
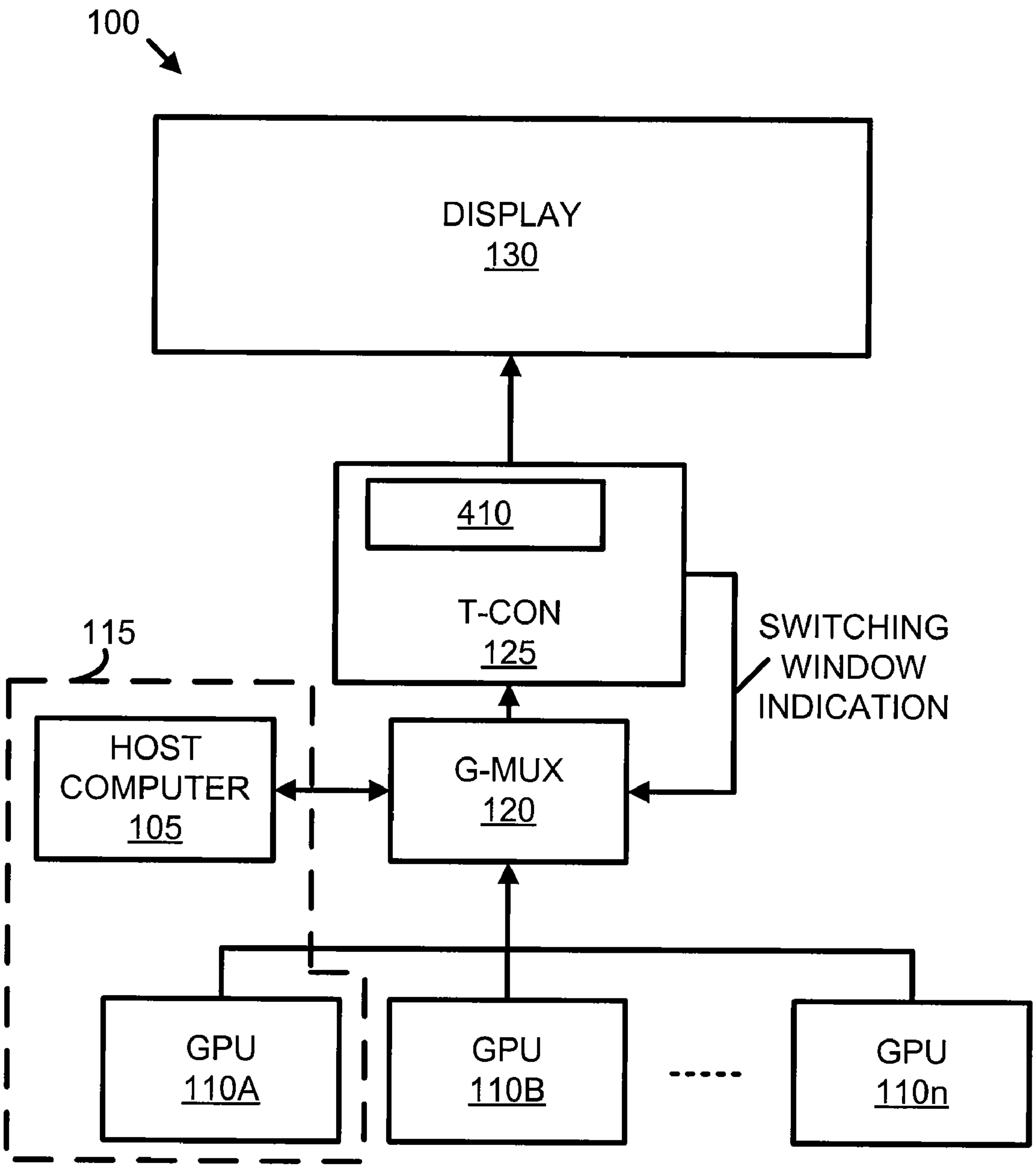
FIG. 1 illustrates an exemplary display system.

FIG. 1 illustrates an exemplary display system 100 that may be implemented in one embodiment. Prior to delving into the specifics of FIG. 1, it should be noted that the components listed in FIG. 1, and referred to below, are merely examples of one possible implementation. Other components, buses, and/or protocols may be used in other implementations without departing from the spirit and scope of the detailed description. Also, although one or more components of the display system 100 are represented using separate blocks, it should be appreciated that one or more of the components of the display system 100 may be part of the same integrated circuit.

Referring now to FIG. 1, the display system 100 may include a host computer system 105. In some embodiments, the host computer 105 may be a laptop computer operating on battery power. In other embodiments, the host computer 105 may be a desktop computer, enterprise server, or networked computer device that operates off of wall power. During operation, the host computer 105 may communicate control signals and other communication signal to various devices within the system.

The display system also may include multiple GPUs 110A-110*n*. These GPUs 110A-110*n* may exist within the computer system 100 in a variety of forms and configurations. In some embodiments, the GPU 110A may be implemented as part of another component within the system 100. For example, the GPU 110A may be part of a chipset in the host computer 105 (as indicated by the dashed line 115) while the other GPUs 110B-110*n* may be external to the chipset. The chipset may include any variety of integrated circuits, such as a set of integrated circuits responsible for establishing a communication link between the GPUs 110-A-110*n* and the host computer 105, such a Northbridge chipset.

A graphics multiplexer (G-MUX) 120 may be coupled to both the host computer 105 and the GPUs 110A-110*n*. As will be described in greater detail below, during operation, the G-MUX 120 may effectuate switching between the GPUs 110A-110*n*. In some embodiments, the G-MUX 120 may be an analog switch rather than a digital switch. Also, the G-MUX 120 may be integrated within other components within the display system 100, such as a microprocessor within the host computer 105 or any of the GPUs 110A-110*n*.

The G-MUX 120 may be further coupled to a timing controller (T-CON) 125, which may receive video image and frame data from various components in the system. As the T-CON 125 receives these signals, it may process them and send them out in a format that is compatible with a display 130 coupled to the T-CON 125. The display 130 may be any variety including liquid crystal displays (LCDs), plasma displays, cathode ray tubes (CRTs) or the like. Likewise, the format of the video data communicated from the T-CON 125 to the display 130 may include a wide variety of formats, such as display port (DP), low voltage differential signaling (LVDS), etc.

During operation of the video system 100, the GPUs 110A-110*n* may generate video image data along with frame and line synchronization signals. For example, the frame synchronization signals may include a vertical blanking interval (VBI) in between successive frames of video data. Further, the line synchronization signals may include a horizontal blanking interval (HBI) in between successive lines of video data. Data generated by the GPUs 110A-110*n* may be communicated to the T-CON 125.

When the T-CON 125 receives these signals, it may process them and send them out in a format that is compatible with a display 130 coupled to the T-CON 125, such as DP, LVDS, etc.

Referring still to FIG. 1, the GPUs 110A-110*n* may have different operational capabilities. For example, as mentioned above, the GPU 110A may be integrated within another device in the display system 100, such as a chipset in the host computer 105, and as such, the GPU 110A may not be as graphically capable as the GPU 110B, which may be a stand alone discrete integrated circuit. In addition to having different operational capabilities, the GPUs 110A-110*n* may consume different amounts of power. Because of this, it may be necessary to balance the desire to use the GPU 110B (i.e., have more graphical capabilities) with the desire to use the GPU 110A (i.e., consume less power) by switching among the GPUs 110A-110*n*.

In order to perform switching between the GPUs 110A-110*n* without introducing visual artifacts such as glitches or screen tearing, the switching between the GPUs 110A-110*n* should occur during either the VBI and/or during the HBI. Conventional switching techniques often employ a graphics multiplexer or switch that decodes the video data to determine the location of the VBI or HBI within the video data. Conventional graphics multiplexers then switch during this time and then re-encode the video data before sending it along to the T-CON 125. However such conventional approaches often increase performance requirements, power usage, and cost of the graphics multiplexer.

In some embodiments, however, the analog G-MUX 120 may not need to decode and/or re-encode the signals to effectuate a GPU switch. For example, as shown in the embodiment of FIG. 1, the T-CON 125 may provide one or more switching window signals to the G-MUX 120 to indicate a blanking interval (e.g., VBI or HBI) in which the GPU switch may be performed. Since the T-CON 125 may already know where the blanking interval occurs in the video signal, providing this switching window indication to the G-MUX 120 may not require additional circuitry or power consumption. In some embodiments, other blocks such as the host controller 105 and/or one or more of the GPUs 110A-110*n* may provide the switching window signal.

Figure 2:
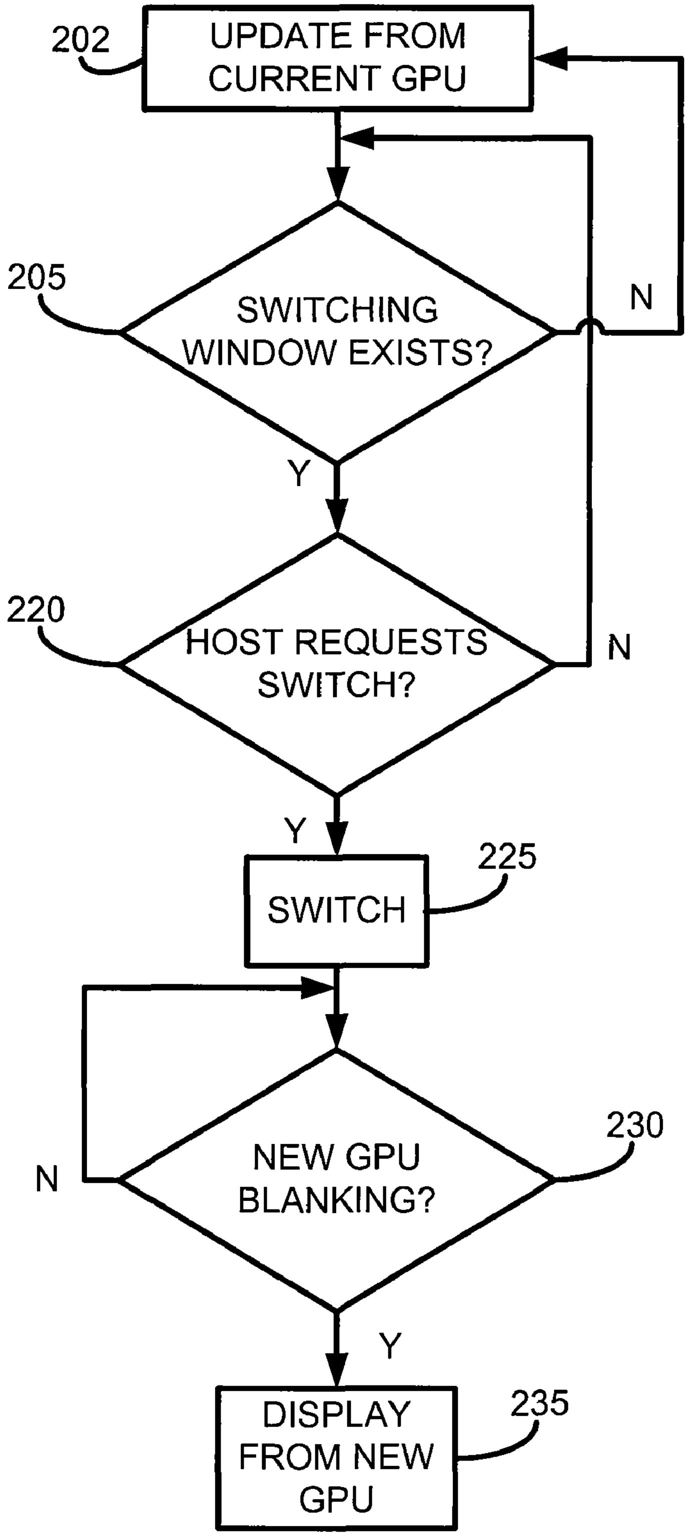
FIG. 2 illustrates exemplary operations that may be performed by the display system.

FIG. 2 illustrates exemplary operations that may be performed by the display system 100 during a GPU switch. In block 202, the operations may begin with the display 130 being updated from a current GPU. Next, in block 205, the G-MUX 120 may await indication that a switching window exists. If a switching window does not exist, then control may flow back to block 202 where the display 130 is updated from the current GPU. In some embodiments, the indication as to whether a switching window exists may come from the T-CON 125, while in other embodiments this indication may come from other blocks within the display system 100. Thus, the G-MUX 120 does not decode the incoming video data to determine when the a blanking interval occurs, but instead may rely on another block, such as the T-CON 125, to provide an indication of when the switching window exists. Because of this, the G-MUX 120 does not need to re-encode the video data before sending it to the display 130, and therefore, the performance requirements of the G-MUX 120 may be simplified. This also may allow the G-MUX 120 to consume less power and cost less than conventional approaches.

Figure 3:
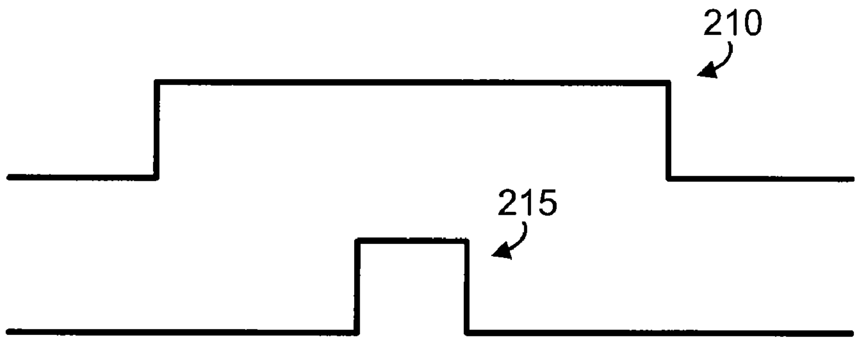
FIG. 3 illustrates an exemplary switch window.

FIG. 3 illustrates exemplary switching windows 210 and 215. In some embodiments, the switching window may mirror the VBI as shown by the switching window 210. During the switching window, the T-CON 125 may be prepared to lose the incoming signal due to a GPU switch. Because of the finite time available for a GPU switch, in some embodiments, the switching window may be smaller than the blanking interval as shown by the switching window 215.

Referring again to FIG. 2, in the event that the T-CON 125 does detect that a switching window exists, control may flow to block 220, where the G-MUX 120 may wait for the host computer 105 to request a GPU switch. As mentioned above, the GPU switch request may occur because the host computer 105 is consuming too much power or because the host computer 105 needs greater graphics processing abilities.

After the T-CON 125 indicates that a switching window exists, the T-CON 125 may enter an "expecting switch" mode and hold the present screen. For example, in one embodiments, the T-CON 125 may repaint the display 130 with an image from a frame buffer (not specifically shown in FIG. 1) repetitively until the G-MUX 120 completes the GPU switch. This may reduce the overall number of visual artifacts resulting from a GPU switch.

Referring still to FIG. 2, as shown in block 220, in the event that the host computer 105 has yet to request a GPU switch, control may flow back to block 205, where it is determined whether a switching window exists. If, however, the host computer 105 has requested the GPU switch while the switching window exists, then the switch may be performed as shown in block 225.

Once the G-MUX 120 has switched GPUs, the T-CON 125 may wait until it sees a blanking interval in the new video data before it stops repainting the display 130 with the old image from the frame buffer and begins painting the image from the new GPU. As shown in block 230, the T-CON 125 may wait until the new GPU enters a blanking period before it begins painting the display 130 from the new GPU (as shown in block 235). In this manner, control may flow back to the block 230 while the T-CON 125 waits for the new GPU to enter a blanking period.

Figure 4:
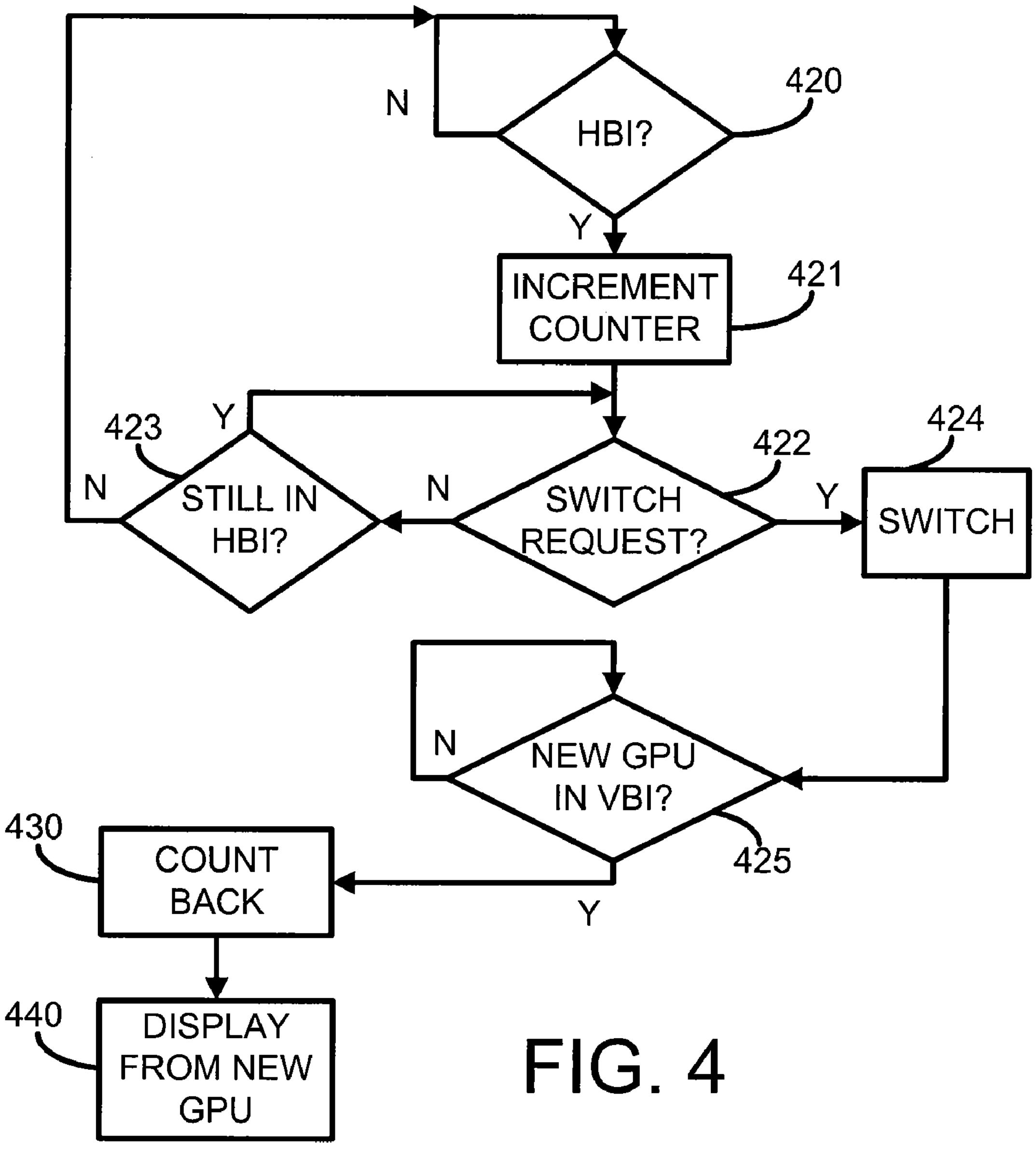
FIG. 4 illustrates exemplary switching operations during a horizontal blanking interval.

As mentioned previously, the GPU switch may occur during the VBI or HBI. FIG. 4 illustrates exemplary operations for performing the GPU switch during the HBI. Frames of video data may be painted on the display at a predetermined rate—e.g., 60 times per second—where a VBI may be present between successive frames. Each frame also may include a plurality of scan lines of video data in pixel form where an HBI may be present between successive scan lines. In block 420, the T-CON 125 may determine whether the current GPU is undergoing an HBI. For example, the T-CON 125 may operate on the display system's 100 pixel clock (not specifically shown in the figures) and note when a predetermined number of pixels representing a scan line have been painted on the display 130 and the current GPU is in an HBI.

Switching between GPUs during an HBI may be more complicated than switching during a VBI because of synchronization of the new GPU with the correct scan line. For example, if the GPU switch occurs after the current GPU paints display scan line n, then the new GPU may need to start updating the display 130 at the beginning of the display scan line n+1. In this manner, the new GPU may need to count back the number of scan lines that have transpired since the GPU switch. Thus, if the current GPU is undergoing an HBI then a counter 410 within the T-CON 125 (shown in FIG. 1) may be incremented per block 421 to note the overall number of HBIs that have occurred since the switch to the current GPU.

Next, the G-MUX 120 may determine if a switch request has occurred in block 422. As shown in FIG. 1, this switch request may come from the host computer 105, although other embodiments are possible where the switch request originates from another block with the system 100. In the event that a switch request has yet to occur, then the T-CON 125 may determine if the current GPU is still undergoing an HBI per block 423. If the current GPU is still undergoing an HBI, then control may loop back to block 422 to again determine if a switch request has occurred. If the current GPU is not still undergoing an HBI, then control may loop back to block 420, where the T-CON 125 may monitor for the condition where the current GPU enters HBI.

Referring still to block 422, in the event that a switch request has occurred, then a glitch-free GPU switch may be performed per block 424. If the new GPU has not yet reached VBI, the control may flow back to block 425 until the new GPU enters VBI. On the other hand, when the new GPU enters VBI, then the value in counter 410 may be read and used to count back the number of scan lines from the VBI for the new GPU to synchronize per block 430. As shown, control may loop back to block 425 until the new GPU is in VBI. In other words, the value in counter 410 may be used as an offset from the VBI to determine the location in the frame of video data from which the new GPU should start painting data so that a glitch free switch occurs on the display 130. After this synchronization, the T-CON 125 may use the new GPU to drive the display 130.

What is claimed is:

1. A display system, comprising:

a plurality of graphics processing units (GPUs);

a multiplexer coupled to the plurality of GPUs;

a timing controller coupled to the multiplexer, the timing controller configured to receive a signal from the multiplexer, wherein the timing controller provides an indication signal to the multiplexer indicative of a period when a first GPU within the plurality is experiencing a first blanking interval.

2. The display system of claim 1, further comprising a display coupled to the timing controller, wherein the multiplexer switches between the first GPU and a second GPU within the plurality such that substantially no visual artifacts are present on the display.

3. The display system of claim 2, wherein the first GPU ceases controlling the display and the second GPU begins controlling the display when the second GPU undergoes a second blanking interval.

4. The display system of claim 3, wherein a difference between the first and second blanking intervals is less than a VBI.

5. The display system of claim 2, further comprising a chipset wherein one of the plurality of GPUs is external to the chipset.

6. The display system of claim 1, further comprising a host computer coupled to the multiplexer, wherein the multiplexer switches between the first and second GPUs when the host computer changes its power state.

7. The display system of claim 1, wherein the timing controller further comprises a counter and a value in the counter is used as an offset from a second blanking interval.

8. A method of switching between GPUs during operation of a display system, the method comprising the acts of:

providing a signal from a switch to a timing controller;

determining, using the signal from the switch, if a switching window exists;

in the event that a switching window exists, determining if a host computer requested a GPU switch;

in the event that a host computer requests a GPU switch, switching from a first GPU to a second GPU;

determining if the second GPU enters a blanking interval that is subsequent to the switching window; and in the event that the second GPU enters a blanking window that is subsequent to the switching window, displaying at least one image on a display from the second GPU.

9. The method of claim 8, wherein the host computer requests a switch based on power consumption needs.

10. The method of claim 8, the display system further comprising a chipset, wherein the second GPU is external to the chipset.

11. The method of claim 8, wherein the switching window is less than a VBI.

12. The method of claim 8, further comprising the act of maintaining image data from the first GPU during the act of switching from the first GPU to the second GPU.

13. The method of claim 8, further comprising the act of providing an indication that the switching window exists to a multiplexer in the display system.

14. The method of claim 13, wherein the act of switching from the first GPU to the second GPU is performed without decoding data to be displayed on the displayed system.

* * * * *